United States Patent [19]

Weber

[11] Patent Number: 4,800,557

[45] Date of Patent: Jan. 24, 1989

[54] OPTICAL DEMULTIPLEX TRANSMISSION EQUIPMENT

[75] Inventor: Jens Weber, Berlin, Fed. Rep. of Germany

[73] Assignee: Krone GmbH, Berlin, Fed. Rep. of Germany

[21] Appl. No.: 763,010

[22] Filed: Aug. 6, 1985

[30] Foreign Application Priority Data

Aug. 27, 1984 [DE] Fed. Rep. of Germany ....... 3431448

[51] Int. Cl.$^4$ .......................... H04B 9/00; G02B 6/34
[52] U.S. Cl. .......................................... 370/3; 370/1; 350/96.19
[58] Field of Search ................ 370/1, 2, 3; 350/96.15, 350/96.16, 96.18, 96.19

[56] References Cited

U.S. PATENT DOCUMENTS

| | | | |
|---|---|---|---|
| 4,265,699 | 5/1981 | Ladany | 350/96.18 |
| 4,274,706 | 6/1981 | Tangonan | 350/96.19 |
| 4,485,475 | 11/1984 | Large et al. | 455/609 |

OTHER PUBLICATIONS

Belovolov et al.-Broadband Channel Divider-Bull. Acad. Sci. Physic Ser (USA), vol. 44, No. 10, 1980, pp. 66-68.
Watanabe et al.-Slab Waveguide Demultiplexer-Applied Optics, vol. 19, No. 21, Nov. 1980, pp. 3588-3590.

*Primary Examiner*—Robert L. Griffin
*Assistant Examiner*—Andrew J. Telesz, Jr.
*Attorney, Agent, or Firm*—Birch, Stewart, Kolasch and Birch

[57] ABSTRACT

In optical demultiplex transmission equipment, light conductor fibers are used for decoupling individual diffracted light signals of different wave length from a multiplex signal. These fibers have their input end regions arranged close together side-by-side in the diffraction plane of a diffraction grating. The respective diffraction angles of the light signals impinging on the grating are adjusted, by variation of the wave length of the light signals, so that the diffracted light beams fall into the input ends of respective output light conductor fibers. However, only every nth light conductor fibre is used for decoupling the various light signals (in which respect n is a natural number greater than one) so there may be spacer fibers disposed between the light-receiving output fiber. In this way, no complex output fibre guide is required and changes in channel spacing are possible without any structural changes being required.

18 Claims, 1 Drawing Sheet

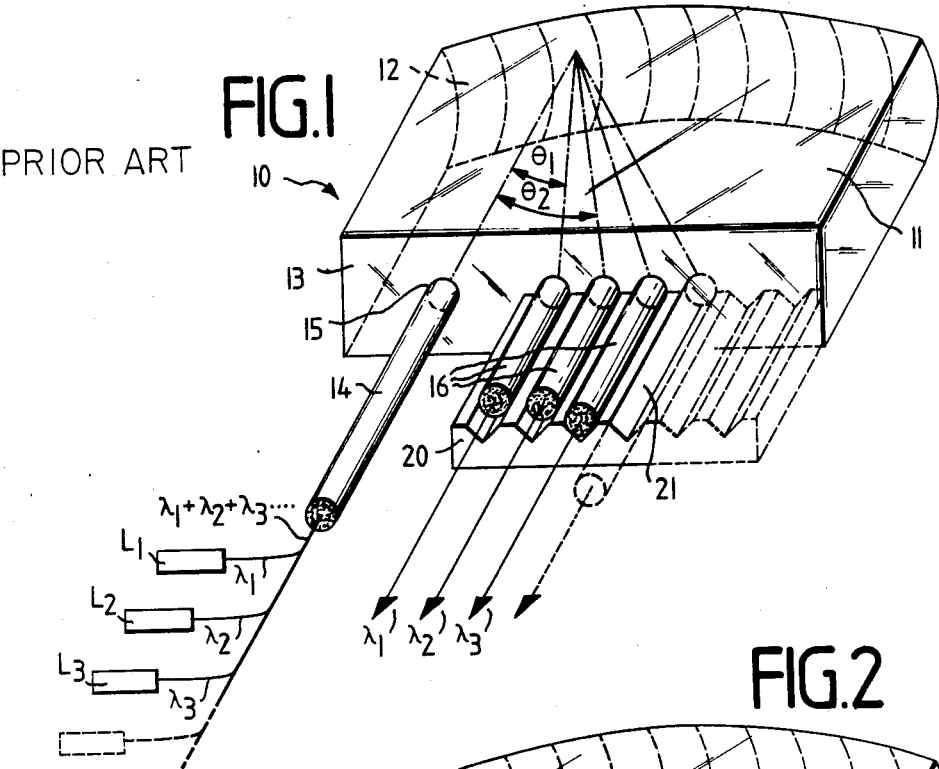
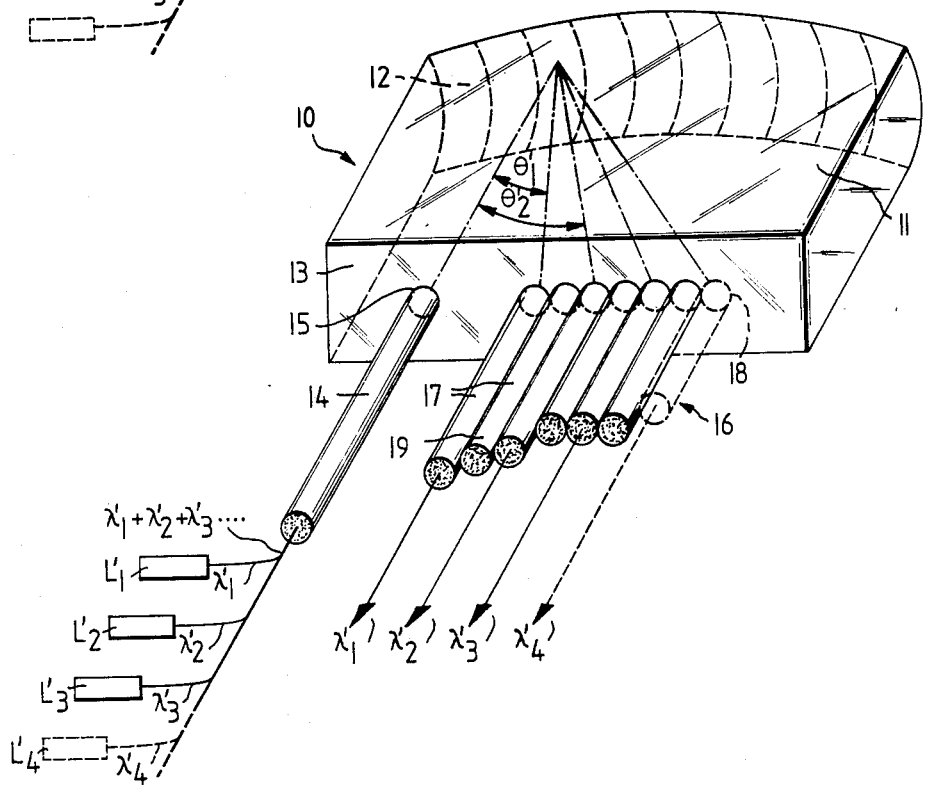

OPTICAL DEMULTIPLEX TRANSMISSION EQUIPMENT

TECHNICAL FIELD OF THE INVENTION

This invention relates to optical demultiplex transmission equipment of the type comprising several light transmitters for generating several light signals of discrete wave lengths, a dispersion grating, a first light conductor which is directed at the dispersion grating and conducts a multiplex signal formed by superimposition of the light signals of various wave lengths, and several second light conductors which are arranged side-by-side in each case with an input end in the diffraction plane of the dispersion grating for separate decoupling of the individual light signals of the multiplex signal.

BACKGROUND ART

In optical communications technology, optical demultiplex equipment with dispersion gratings has proved successful in systems which are used to simultaneously process a large number of light signals of different wave length. The most favourable features of dispersion gratings is their relatively small overall size and their relatively low insertion damping of each transmission channel.

A considerable problem arises in the use of dispersive grating demultiplex equipment relates to the channel separation. In currently known wavelength multiplex equipment, the wave length difference between adjacent channels, in other words the channel spacing, is fixed at a specific value, for example 30 nm. As a consequence of this, taking into account the geometry which is preset by the construction of the dispersion grating, there must be a specific arrangement of the light conductor fibers intended for decoupling of the individual channels.

BRIEF DESCRIPTION OF THE DRAWINGS

FIG. 1 is a prior art view of a conventional dispersive grating demultiplexer.

FIG. 2 is a view of the preferred embodiment of a dispersive grating demultiplexer which utilizes output spacing fibers according to the teachings of the present invention.

DETAILED DISCLOSURE OF THE PRIOR ART

FIG. 1 shows an example of conventional demultiplex transmission equipment 10. A dispersion grating is formed as a reflection grating 12 on a spheric side surface of a solid body 11 made from a material which is transparent in the wave length range of the light signals to be transmitted. That side surface 13 of the body 11 which lies opposite the reflection grating 12 stands perpendicular to the diffraction plane of the reflection grating 12. A first light conductor fiber or input conductor fibre 14 has an exit end 15 which is fastened to this surface 13, for example by being bonded thereto with a transparent adhesive. This input light conductor fiber 14 conducts a multiplex signal $\lambda_1$, $\lambda_2$, $\lambda_3$, etc. . . . consisting of several light signals of different wave lengths ($\lambda_1$, $\lambda_2$, $\lambda_3$, etc. . . .). The carrier light waves of these individual light signals are generated by light transmitters $L_1$, $L_2$, $L_3$, . . . etc.

The light transmitters are monochromatic and they are usually lasers, particularly semiconductor lasers. The multiplex signal $\lambda_1$, $+\lambda_2$, $\lambda_3$ etc. travels through the transparent body 11 and is diffracted at the side surface formed as the reflection grating 12 and reversed in its direction. Since the diffraction angle $\lambda_1$, $\lambda_2$, . . . etc. in each case depends on the respective wave length $\lambda_1$, $\lambda_2$, . . . etc. of the light incident on the reflection grating 12, the diffracted beams impinge as a function of the respective wave length $\lambda_1$, $\lambda_2$, . . . etc. at various locations on that side 13 of the body 11 which lies opposite to the reflection grating 12. In order to compensate for the spread of the diffracted light beams in the body 11, the surface carrying the reflection grating 12 is spheric convex in design so that the diffracted beams are bunched or focused.

The spacing of the points of impingement of the individual light signals of different wave length depends on the individual diffraction angles and on the distance between the reflection grating 12 and the side surface 13 lying opposite it. With a preset channel spacing, the latter distance is so selected that at the points of impingement of the diffracted light beams on the side surface 13 specific output light conductor fibers 16 for decoupling of the individual light signals can be arranged at such a spacing relative to one another that a cross-talk or mixing of adjacent channels is nearly avoided.

Conventionally, these output light conductor fibers 16 are held, in their region butting against the body 11, at the spacings preset by the grating geometry and the channel spacings by means of a precision fixing and guidance mechanisms 20. This guidance mechanism 20 has a number of V-shaped grooves corresponding to the number of the output light conductor fibers 16. The V-shaped grooves 21 are arranged side-by-side and their spacings are determined by the geometry of the grating arrangement and by the light wave lengths $\lambda_1$, $\lambda_2$, . . . etc. used or, respectively, by the channel spacings. A retaining surface having etched-in holes at appropriate spacings can likewise be used in place of the grooved mechanism 20. In this case the fibers are similarly held in exact spacing by being bonded into these holes.

Such a fixing mechanism 20 usually consists of a precision component which is made from an aluminum/brass alloy and which is very expensive and complex to produce. Furthermore, for each special application of the multiplex system a new fixing and guidance mechanism adapted to the light wave lengths used for the individual channels and to the particular grating geometry has to be produced. In other words, the fixing and guidance mechanism effectively fixes the light wave lengths which can be used in the multiplex signal.

OBJECTS OF THE INVENTION

An object of the invention is to provide optical demultiplex transmission equipment, of the kind described at the beginning hereof, in which no complex guidance mechanism for the light conductors intended for decoupling of the individual light signals is necessary.

A further object is to provide such equipment wherein a change in the channel spacings and/or the wave lengths of the light signals of a multiplex signal that is to be processed is possible without structural changes being necessary.

BRIEF DISCLOSURE OF THE INVENTION

These objects are achieved by provision of optical demultiplex transmission equipment of the general type described at the beginning hereof wherein the surfaces of the output light conductors are arranged close together in the region of their input ends and wherein the light transmitters ($L_1'$, $L_2'$, $L_3'$... etc.) emit light signals having predetermined wave length ($\lambda_1'$, $\lambda_2'$, ... etc.) selected such that the light signals diffracted by the grating impinge in each case only on every nth input end of the output light conductors, where n is a natural number greater than one.

As a result of these measures a piece of optical demultiplex transmission equipment is provided in which the light conductors intended for decoupling the individual light signals of various wave lengths are arranged close together or adjacently in the region of their input ends and in which only every 2nd, 3rd, ... or respective nth light conductor is acted upon with a light signal of respective wave length. The respective diffraction angle is so adjusted, by varying the wave length of the light signal of each channel, that the diffracted light beam falls on the input end of the corresponding output light conductor. Thus, a special guidance mechanism for the output light conductors is superfluous and the optical demultiplex equipment in accordance with the invention can be produced at lower cost than the known equipment described above. The equipment in accordance with the invention can be produced at lower cost than the known equipment described above. Moreover, the equipment in accordance with the invention can be used, without constructional changes, with various light wave lengths, or, respectively, various channel spacings. Also, a change of individual wave lengths of a multiplex signal can readily be carried out with the equipment in accordance with the invention provided only that there is at least one further light conductor not used up till then lying between two channel-conducting output light conductors.

In this way the spacing between the individual output light conductor fibers 16 can be better adjusted to the respective output wave lengths. Such a light conductor bunch or bundle can be shifted for optical tuning depending on the degree of efficiency of the reflection grating 12 in block displacement.

DETAILED DESCRIPTION OF THE INVENTION

A preferred exemplified embodiment of the optical demultiplex transmission equipment in accordance with the invention will be described hereinunder with reference to FIG. 2 of the drawings.

In the exemplified embodiment shown in FIG. 2 the same reflection grating 12 is used which has already been described in connection with the conventional demultiplex arrangement shown in FIG. 1. The components in FIG. 2 which are the same as those in FIG. 1 are therefore provided with the same reference symbols and will not be explained in any further detail to avoid unnecessary repetition.

In the optical demultiplex transmission equipment 10 in accordance with the invention, in the regions of the input ends 18 of output light conductor fibers 16, the peripheral surfaces 17 of the fibers 16 are arranged close together side-by-side or adjacent to each other in the diffraction plane of the dispersion grating 12. The input ends 18 of the output light conductors fibers 16 butt against that side surface 13 of the body 11 which lies opposite the reflection grating 12 and they are fastened there, for example with an adhesive which is transparent in the relevant wave length range. The peripheral surfaces 17 of the light conductor fibers 16 can be bonded to one another and/or be fastened on a flat common carrier (not shown).

If each of the light conductor fibers 16 of this arrangement were to be used for decoupling a light signal, the channel spacing, i.e. the difference in the wave lengths of the light signals decoupled by way of two adjacent light conductor fibers 16, would have to be selected to be correspondingly slight, but the separation of adjacent channels would also be reduced to a few dB (decibels). For decoupling the individual light signals of different wave length, only every nth light conductor fiber 16 is used, in where n is a natural number greater than 1. The value of the number n depends on the necessary channel separation and on the channel spacings of the individual light signals one from another.

FIG. 2 illustrates the case where n=2. In each case a single fiber 19 which serves merely as a spacer is arranged between the signal-conducting light conductor fibers. These spacer fibers 19 can, in the appropriate circumstances, be cut off at a specific length from the body 11. The diameter gradient fibers, which are usually used for this purpose, is about 125 $\mu$m. A distance of 125 $\mu$m between two signal-conducting light conductor fibers 16 suffices, as a rule, to guarantee an adequate channel separation. The spacing can, however, be doubled, tripled and so forth, by only every 2nd, 3rd, 4th ... etc. light conductor fiber 16 receiving a signal. In other words, with a preset reflection or dispersion grating arrangement, in order that the individual light signals, of the various channels which are separated at the diffraction grating impinge exactly on the entry ends 18 of the corresponding output light conductor fibers 16, the wave lengths $\lambda_1'$, $\lambda_2'$, $\lambda_3'$, ... of the individual light signals have to be so varied that the diffraction angles $\lambda_1'$, $\lambda_2'$, ... are adapted to the arrangement of the second light conductor fibers 16.

As previously mentioned, lasers are usually used as the monochromatic light transmitters $L_1'$, $L_2'$, ... etc. When this is the case, the wave length of the emitted light $\lambda_i'$ can be varied by changing the temperature of the laser (approx. 0,3 mm/°C.). Thus, for each light signal, the temperature of the corresponding laser $L_i'$ is so adjusted that light with the wave length $\lambda_i'$ (corresponding to the laser temperature) is diffracted at the reflection grating 12 at such an angle $\theta'$ that the diffracted light beam falls on the input end 18 of the second light conductor fibre 16 intended for decoupling this light signal.

A light conductor fiber bunch for decoupling the individual channels of a multiplex signal usually consists of about forty to fifty light conductor fibers 16. If, for example, five to ten different channels are superimposed in a multiplex signal, a user has considerable freedom to select the spacings between the signal-conducting second light conductor fibers 16 in accordance with the desired channel spacings and to select the laser transmitters (from those available on the market, at any one time) having the necessary channel separation.

In the demultiplex transmission equipment 10 shown in FIG. 2, a reflection-dispersion grating 12 is used. The invention is not, however, restricted to the use of such gratings. Indeed, the invention also applies to demultiplex equipment incorporating other available dispersive optical components, such as through-transmission diffraction gratings etc. In each case the adaptation of the light propagation paths of the individual signals to the respective geometry of the dispersive optical component used is effected by way of the variation of the wave lengths of the light signals. Furthermore, various kinds of light transmitters, such as semiconductor lasers, gas lasers can be used. All that is essential is that the emitted wave length can be varied and it is sufficient monochromatic. In the case of lasers, this wave length variation can be achieved by changing the laser temperature, but it can also be achieved in other ways, for example, in the case of gas lasers, by adjusting the etalon or standard or by resonator systems which have a wide range of variations.

The output light conductor fibers 16 may have an outside diameter of about 100 $\mu$ in the case of monomode version and about 240 $\mu$ in the case of multimode version. However, they are surrounded with a jacket 17 (coating) giving a thickness of about 100$\mu$.

The input ends 18 of the output light conductor fibers 16 may be etched so as to accurately define their outside diaemter so that they lie at a predetermined spacing relative to one another. Hydrofluoric acid (HF) may, for example, be used as the etching medium.

I claim:

1. An optical demultiplex transmission apparatus comprising:
    a plurality of light transmitters for emitting light signals of discrete wave lengths;
    a dispersion grating;
    a first light conductor disposed between said light transmitters and said dispersion grating and directed at said dispersion grating for conducting a multiplex signal formed by superposition of said light signals; and
    a plurality of second light conductors each having an input end arranged in a diffraction plane of the dispersion grating, for individually decoupling the light signals from said multiplex signal into individual signals having discrete wave lengths, said second light conductors also having respective input ends adjacently arranged in juxtaposition to each other, said second light conductors including output conductors and spacing conductors interpersed therebetween, only every nth second light conductor forming an output conductor where N is a natural number greater than one, adjacent said output conductors being spaced apart by said spacing conductors;
    said light transmitters emitting said light signals with their discrete wave lengths being tuned so that said light signals are diffracted by said grating to substantially impinge only on said output conductors.

2. The apparatus of claim 1 wherein said light transmitters comprise lasers.

3. The apparatus of claim 2 wherein the wave length of the laser light of each light transmitter is tuned by adjusting the laser temperature.

4. The apparatus of claim 1 wherein the peripheral surfaces of said second light conductors are bonded to one another adjacent to their said input ends.

5. The apparatus of claim 1 further including a flat common carrier to which said second light conductors are fastened in the region of said input ends.

6. The apparatus of claim 1 wherein said second light conductors not receiving a light signal are cut off after a specific length.

7. The apparatus of claim 1 wherein said first and second light conductors consist of light conductor fibers.

8. The apparatus of claim 7 wherein said second light conductor fibers are etched to specific diameters in the region of their said input ends.

9. An optical demultiplex transmission apparatus comprising:
    a plurality of light transmitters for emitting light signals of discrete wavelengths;
    a dispersion grating;
    a first light conductor receiving said light signals from said plurality of light transmitters and for providing a multiplex signal formed by superposition of said light signals; and
    a plurality of optical fibers with input ends juxtaposed in colinear alignment with each other adjacent said dispersion grating, said optical fiber including,
        a plurality of light receiving fibers for receiving light signals from said dispersion grating, and
        a plurality of spacing fibers serving only a spacing function,
    said light receiving fibers being separated from each other by at least one said spacing fiber.

10. The apparatus of claim 9 wherein said light transmitters comprise lasers.

11. The apparatus of claim 10 wherein the wave length of the laser light of each light transmitter is tuned by adjusting the laser temperature.

12. The apparatus of claim 9 wherein said first light conductor is also an optical fiber.

13. The apparatus of claim 12 wherein said optical fibers are etched to a specific diameter in the region of their input ends.

14. The apparatus of claim 12 wherein said optical fibers are all of the same cross-sectional size.

15. The apparatus of claim 9 wherein the peripheral surfaces of said optical fibers are bonded to one another adjacent to their input ends.

16. The apparatus of claim 9 further comprising a flat common carrier supporting said optical fibers which are fastened thereto at their input ends.

17. The apparatus of claim 9 wherein said spacing fibers are all sized to a specific length.

18. The apparatus of claim 9 wherein said optical fibers are all of the same cross-sectional size.

* * * * *